United States Patent [19]

Mueller et al.

[11] Patent Number: 5,625,013

[45] Date of Patent: Apr. 29, 1997

[54] PREPARATION OF A SUPPORTED CATALYST FOR THE POLYMERIZATION OF α-OLEFINS

[75] Inventors: Hans-Joachim Mueller, Gruenstadt; Godofredo Follmer, Maxdorf; Rainer Konrad, Goennheim; Roland Saive, Ludwigshafen; Martin Lux, Dannstadt-Schauernheim; Hans-Helmut Goertz, Freinsheim; Guido Funk, Worms, all of Germany

[73] Assignee: BASF Aktiengesellschaft, Ludwigshafen, Germany

[21] Appl. No.: 422,937

[22] Filed: May 24, 1995

Related U.S. Application Data

[62] Division of Ser. No. 124,047, Sep. 21, 1993, Pat. No. 5,455,216.

[30] Foreign Application Priority Data

Sep. 23, 1992 [DE] Germany .................. 42 31 749.5

[51] Int. Cl.⁶ ...................... B01J 35/08; C08F 4/24
[52] U.S. Cl. .................... 526/106; 502/256; 502/228; 502/237; 526/130
[58] Field of Search .................... 502/256, 228, 502/237, 238; 526/106, 130

[56] References Cited

U.S. PATENT DOCUMENTS

| | | | |
|---|---|---|---|
| 3,509,116 | 4/1970 | Cole et al. ............... | 260/88.2 |
| 4,042,770 | 8/1977 | Bachl et al. ............... | 526/106 |
| 4,397,769 | 8/1983 | McDaniel et al. .......... | 502/256 |
| 5,310,712 | 5/1994 | Funk et al. ............... | 502/256 |
| 5,455,216 | 10/1995 | Mueller et al. ............ | 502/256 |

*Primary Examiner*—Asok Pal
*Attorney, Agent, or Firm*—Keil & Weinkauf

[57] ABSTRACT

A process for the preparation of a supported catalyst for the polymerization of α-olefins, in which (1) a silicon dioxide-containing support gel is prepared by
   (1.1) introducing a sodium water glass or potassium water glass solution into a swirling stream of an aqueous mineral acid longitudinally and tangentially to the stream, spraying the resultant silica hydrosol in drop form into a gaseous medium and allowing it to solidify to form a hydrogel, and freeing the resultant hydrogel from salts by washing without prior ageing,
   (1.2) drying the hydrogel resulting from (1.1) to form the support gel,
(2) the support gel (1) is charged with chromium trioxide or a chromium compound which can be converted into chromium trioxide under the conditions of process step (3), giving a chromium-containing support gel, and
(3) the chromium-containing support gel (2) is heated at from 400° to 1100° C. for from 10 to 1000 minutes in an anhydrous gas stream containing oxygen in a concentration of greater than 10% by volume, comprises drying the hydrogel resulting from step (1.1) in step (1.2) within a time of not more than 60 seconds in a shaping, high-speed dryer at an inlet temperature of from 80° to 400° C.

2 Claims, No Drawings

PREPARATION OF A SUPPORTED CATALYST FOR THE POLYMERIZATION OF α-OLEFINS

This is a Division of application Ser. No. 08/124,047, filed Sep. 21, 1993, now U.S. Pat. No. 5,455,216.

The present invention relates to a novel process for the preparation of a supported catalyst for the polymerization of α-olefins, in which (1) a silicon dioxide-containing support gel is prepared by
 (1.1) introducing a sodium water glass or potassium water glass solution into a swirling stream of an aqueous mineral acid longitudinally and tangentially to the stream, spraying the resultant silica hydrosol in drop form into a gaseous medium and allowing it to solidify to form a hydrogel, and freeing the resultant hydrogel from salts by washing without prior ageing,
 (1.2) drying the hydrogel resulting from (1.1) to form the support gel,
(2) the support gel (1) is charged with chromium trioxide or a chromium compound which can be converted into chromium trioxide under the conditions of process step (3), giving a chromium-containing support gel, and
(3) the chromium-containing support gel (2) is heated at from 400° to 1100° C. for from 10 to 1000 minutes in an anhydrous gas stream containing oxygen in a concentration of greater than 10% by volume.

The present invention furthermore relates to a novel supported catalyst for the preparation of polymers of α-olefins which is obtainable by the novel process, and to the α-olefin polymers prepared with the aid of this novel supported catalyst.

The abovementioned process for the preparation of a supported catalyst for the polymerization of α-olefins is disclosed, apart from the improvement according to the invention, in EP-A 0 429 937. It is essential for this known process that the hydrogels resulting from step (1.1) are dried at a maximum of 180° C. under a reduced pressure of 13.3 mbar until no further weight loss occurs. Drying times of several hours are necessary for this purpose.

Furthermore, DE-A 41 32 894 likewise discloses a process for the preparation of a supported catalyst for the polymerization of α-olefins, in which the drying time of the support gels necessary for the preparation of the supported catalyst can be reduced to a few seconds. The drying here is carried out in a high-speed dryer at an inlet temperature of from 200° to 600° C. Supported catalysts prepared in this way can be used to give α-olefin polymers having improved low-temperature toughness and processing properties.

The drying methods described in EP-A 0 429 937 and DE-A 41 32 894 for the preparation of the support gels do not involve shaping, and the resultant supports are consequently obtained either as splintery fragments of expanding hydrogel (EP-A 0 429 937) or as particles of undefined morphology (DE-A 41 32 894), which must subsequently be ground. The particles having sizes of less than 30 μm obtained from this grinding process are undesired in the polymerization process since they are responsible for the formation of fine polymer dust. In order to eliminate this fine dust, which makes up about 20% of the entire amount of support, it must be separated off by screening and subsequently discarded, which involves a not inconsiderable increase in the process complexity.

It is an object of the present invention to provide a novel process which allows the preparation of a supported catalyst for the polymerization of α-olefins in a particularly simple and reliable manner avoiding the outlined disadvantages, where the novel supported catalyst should, inter alia, have high productivity and in addition should be particularly suitable for the preparation of high-molecular-weight α-olefin polymers having good processing properties and very good morphology.

We have found that this object is achieved in an elegant and unforeseeable manner on the basis of DE-A 41 32 894 by modifying the drying of the hydrogels necessary for the preparation of the supported catalyst.

The present invention accordingly provides a novel process for the preparation of a supported catalyst for the polymerization of α-olefins, in which (1) a silicon dioxide-containing support gel is prepared by
 (1.1) introducing a sodium water glass or potassium water glass solution into a swirling stream of an aqueous mineral acid longitudinally and tangentially to the stream, spraying the resultant silica hydrosol in drop form into a gaseous medium and allowing it to solidify to form a hydrogel, and freeing the resultant hydrogel from salts by washing without prior ageing,
 (1.2) drying the hydrogel resulting from (1.1) to form the support gel,
(2) the support gel (1) is charged with chromium trioxide or a chromium compound which can be converted into chromium trioxide under the conditions of process step (3), giving a chromium-containing support gel, and
(3) the chromium-containing support gel (2) is heated at from 400° to 1100° C. for from 10 to 1000 minutes in an anhydrous gas stream containing oxygen in a concentration of greater than 10% by volume, which comprises drying the hydrogel resulting from step (1.1) in step (1.2) within a time of not more than seconds in a shaping, high-speed dryer at an inlet temperature of from 80° to 400° C.

The present invention furthermore provides a novel supported catalyst for the polymerization of α-olefins, which can be prepared by the novel process.

For brevity, the novel process for the preparation of a supported catalyst for the polymerization of α-olefins is referred to below as the process according to the invention. For the same reason, the novel supported catalyst for the polymerization of α-olefins is abbreviated below to the supported catalyst according to the invention.

The process according to the invention proceeds from the preparation of the silicon dioxide-containing support gel (1) from step (1).

For this purpose, first the silica hydrogel disclosed in DE-B 25 40 278 is prepared (step 1.1). This known silica hydrogel generally has a solids content of from 10 to 25% by weight (calculated as silicon dioxide or aluminum silicon oxide). It is generally spherical, having a particle diameter in the range of from 1 to 8 mm. It is obtained by introducing a sodium water glass solution or potassium water glass solution into a swirling stream of an aqueous mineral acid longitudinally or tangentially to the stream, spraying the resultant silica hydrogel in drop form into a gaseous medium, allowing the hydrogel to solidify, and freeing the resultant, substantially spherical hydrogel from salts by washing without prior ageing.

The aqueous mineral acid may also contain aluminum ions. If aluminum ions are present in the aqueous mineral acid, they are used in an amount which produces an $Al_2O_3$ content of from 1 to 15% by weight in the support gel (1).

According to a preferred variant of the process according to the invention, a maximum of 95% by weight of the water present in the hydrogels can be extracted. The term hydrogels relates to the hydrogels resulting from step (1.1). This further step (1.1.1), which should be carried out before the drying (1.2), is performed using, in particular, organic solvents. Examples of suitable organic solvents are, in particular, $C_1$- to $C_4$-alcohols, such as methanol, ethanol, isopropanol and tert-butanol, $C_3$- to $C_5$-ketones, such as acetone and butanone, and mixtures of these. It is advantageous to extract from 0.1 to 60% by weight, in particular 1 to 50% by weight, of the water present in the hydrogel in an extraction in step (1.1.1). The water-extraction method has no peculiarities, but can be carried out in conventional and known extraction equipment, such as column extractors. In addition, it is advantageous for the extraction to add up to 50% by volume of water to the solvent before the extraction, so long as this is possible without phase separation.

The hydrogel resulting from step (1.1) or (1.1.1) is, according to the invention, dried in a shaping, high-speed dryer at an inlet temperature of from 80° to 400° C. (step 1.2). The shaping, high-speed dryers used are usually the shaping spray dryers known in the art. However, the shaping, high-speed dryers may alternatively be shaping, spray fluidized beds. The drying time in step (1.2) should in the process according to the invention, be not more than 60 seconds, in particular not more than 30 seconds. Drying times of less than 8 seconds have proven particularly advantageous.

The drying temperatures at the injection nozzle of the shaping, high-speed dryer used in step (1.2) should be in the range from 80° to 400° C., in particular from 100° to 350° C. Preference is given for this purpose to shaping spray dryers having a height of at least 1.5 meters and a tube diameter of from 0.5 to 2 meters. In general, shaping spray dryers of this type operate with a throughput of fuel gas or heating air in the order of from 100 to 2000 kg/h, in particular from 200 to 1500 kg/h. The hydrogel to be dried is advantageously sprayed via a disk rotating at about 10,000 revolutions per minute, the rotating disk usually having a diameter of from 150 to 300 mm. Shaping, high-speed dryers of this type are known in the art. The support gel resulting from the drying step (1.2) is preferably separated off in separation devices, for example in cyclones, after passing through the shaping, high-speed dryer. Resultant support gels can subsequently be comminuted in grinding devices, for example in mills.

It may furthermore be advisable for the carrier gels obtained from step (1.2), before they are charged (in step (2)) with chromium trioxide or a chromium compound which can be converted into chromium trioxide, to be classified (step 1.2.1). This can be carried out in conventional classification equipment, for example in suitable sieve devices.

The carrier gels obtainable from step (1.2) or (1.2.1) are produced essentially as spherical particles having a diameter of from 10 to 300 µm, in particular from 50 to 150 µm. Advantageous carrier gels have a surface area of from 100 to 1000 m²/g, in particular from 200 to 600 m²/g, and a pore volume of from 0.5 to 2.5 cm³/g, in particular from 0.8 to 2.0 cm³/g. The pore radius of these carrier gels is generally from 40 to 200 Å, in particular from 40 to 140 Å.

The carrier gels obtained according to the invention are highly suitable for the preparation of the catalyst according to the invention.

To this end, the carrier gels prepared in the above-described manner are charged, in step (2), with chromium trioxide or with a compound which can be converted into chromium trioxide under the conditions of step (3) described below in detail, by known methods, as described, for example, in DE-B 25 40 278 and DE-A 36 40 802. The charging is carried out at a carrier gel: chromium weight ratio of from 100:0.1 to 100:10, in particular from 100:0.3 to 100:3.

In this step, the support gel (1) is advantageously suspended in a solution of chromium trioxide or of a compound which can be converted into chromium trioxide under the conditions of step (3), and the liquid constituents of the suspension, such as alcohols and/or ketones, and, if present, water, are evaporated while the suspension is mixed very homogeneously. Temperatures of from 20° to 150° C. and pressures of from 10 mbar to 1 bar are preferably maintained during this operation. It proves advantageous for the chromium-containing support gel (2) to have a certain residual moisture content. However, the volatile constituents should make up not more than 20% by weight, in particular not more than 10% by weight, based on the support gel (2).

Examples of suitable chromium compounds, in addition to chromium trioxide and chromium hydroxide, are salts of trivalent chromium with organic and inorganic acids, such as chromium acetate, oxalate, sulfate and nitrate, and chelates of trivalent chromium, such as chromium acetylacetonate. Of these, preferred compounds are those which can be converted into chromium trioxide in step (3) without leaving a residue. Of these, chromium (III) nitrate 9-hydrate is in turn very particularly preferred.

In the preparation of the chromium-containing support gel (2), inorganic, fluoride-containing compounds can also be applied to the support gel resulting from step (1). Examples of suitable inorganic, fluoride-containing compounds are lithium fluoride, sodium fluoride, potassium fluoride, ammonium hexafluorosilicate, sodium hexafluorosilicate and potassium hexafluorosilicate, of which ammonium hexafluorosilicate is particularly preferred. The inorganic, fluoride-containing compounds can be applied as solutions or solids. They are advantageously applied in an amount which gives a fluoride content in the chromium-containing support gels (2) of from 0.1 to 3.2% by weight.

It is furthermore possible to prepare the chromium-containing support gel (2) in the presence of a number of organophosphorus compounds, for example triethyl phosphate and triphenyl phosphate, as dopes. These compounds are best applied to the support gel from an alcoholic solution, for example from methanol. The organophosphorus compounds are advantageously applied in such an amount that the phosphorus content in the chromium-containing support gels (2) is from 0.1 to 2.5% by weight.

In step (3) of the process according to the invention, the chromium-containing support gel (2) is activated. As far as the method is concerned, this activation has no peculiarities; the methods disclosed in DE-A 15 20 467 can be used. In this step, the chromium-containing support gel (2) is advantageously heated at from 400° to 1100° C., in particular at from 500° to 800° C., for from 10 to 1000 minutes, in particular from 150 to 750 minutes, in an anhydrous gas stream containing oxygen in a concentration of greater than 10% by volume, and is then cooled to room temperature, giving the supported catalyst according to the invention.

Step (3) can also include application of at least one of the abovementioned inorganic, fluoride-containing compounds to the chromium-containing support gels (2) still present or to the particles of the supported catalyst according to the invention which were already present, in a conventional and known manner in an amount of up to 10% by weight, based on the supported catalyst (3) according to the invention. In this case, the fluorides are advantageously applied as solids.

The supported catalyst according to the invention obtained in the procedure according to the invention advantageously has a chromium content of from 0.5 to 3.0% by weight, in particular from 0.7 to 1.5% by weight, and can be used directly for the polymerization of α-olefins by conventional processes.

Irrespective of whether these known polymerization processes are batch or continuous suspension polymerization processes, solution polymerization processes or gas-phase polymerization processes in a stirred or fluidized fixed bed, the catalyst according to the invention is superior to the previously known catalyst and gives α-olefin polymers having an excellent applicational property profile. The supported catalyst according to the invention has particular advantages in the preparation of grit-form ethylenehomopolymers and of copolymers of ethylene with secondary amounts of copolymerized $C_3$- to $C_{12}$-α-monoolefins. Polymerization processes using the supported catalyst according to the invention are advantageously carried out at from 70° to 150° C. and at from 2 to 150 bar.

The α-olefin polymers obtainable with the aid of the supported catalyst according to the invention are distinguished, inter alia, by high molecular weight, characterized by intrinsic viscosities of from 300 to 600 cm$^3$/g, good processing properties and very high bulk density. The spherical shape of the supported catalyst, likewise according to the invention, is, surprisingly, reproduced in the polymer particles produced, which are also distinguished, in particular, by good morphology.

The melt flow index of the resultant polymers, at 190° C. and under a weight of 2.16 kg (in accordance with DIN 53 735), is usually from 0.01 to 1 g/10 min, in particular from 0.1 to 0.5 g/10 min (MFI). At higher loads, ie. a weight of 21.6 kg instead of 2.16 kg, the melt flow index is generally from 0.5 to 20 g/10 min, in particular from 1.0 to 20 g/10 min (HLMI). This gives a melt flow ratio (HLMI/MFI) of from about 20 to 200, in particular from 50 to 200.

The supported catalyst according to the invention is also distinguished by notably high productivity compared with the prior art.

The α-olefin polymers prepared with the aid of the supported catalyst according to the invention are particularly suitable for the production of films and moldings by blown film extrusion or blow molding, where even the polymers prepared directly from polymer grit without prior homogenization have high shock resistance. In addition, the homopolymers and copolymers of ethylene prepared with the aid of the catalyst according to the invention are highly suitable for the production of containers authorized for hazardous materials.

EXAMPLES AND COMPARATIVE EXPERIMENTS

Preparation of the supported catalyst according to the invention by the process according to the invention, and the use thereof for the polymerization of ethylene

Example

Experimental procedure:
1.1 Preparation of the support gel (1)

The support gel (1) was prepared using a mixing nozzle shown in the figure in U.S. Pat. No. 3,872,217, having the following dimensions: the diameter of the cylindrical mixing chamber formed from a plastic pipe was 14 mm, the length of the mixing chamber (including the post-mixing zone) was 350 mm. A tangential inlet aperture with a diameter of 4 mm for the mineral acid was installed close to the mixing chamber inlet side, which was sealed at the end. This was followed by four further apertures, likewise with a diameter of 4 mm and the same inlet direction for the water glass solution, the separation of the apertures from one another, measured in the longitudinal direction of the mixing chamber, being 30 mm. Accordingly, the length:diameter ratio for the primary mixing zone was approximately 10:1. For the subsequent, secondary mixing zone, this ratio was 15:1. As the outer die ring, a flattened, slightly kidney-shaped piece of piping was pushed over the outlet end of the plastic tube.

This mixing device was charged with 325 l/h of 33% strength by weight sulfuric acid at 20° C. at an operating pressure of about 3 bar and with 1100 l/h of water glass solution (prepared from technical-grade water glass containing 27% by weight of $SiO_2$ and 8% by weight of $Na_2O$ after dilution with water) weighing 1.2 kg/l likewise having a temperature of 20° C., and likewise at a pressure of about 3 bar. An unstable hydrosol having a pH of 7 to 8 was formed by continuing neutralization in the mixing chamber lined with the plastic tube, and remained in the post-mixing zone for approximately a further 0.1 second until homogenization was complete, before it was sprayed into the atmosphere through the die ring as a sheet-like liquid Jet. During its flight through the air, the Jet divided into individual drops, which, due to surface tension, took on a substantially spherical shape and solidified within about 1 second during their flight to give hydrogel spheres. The spheres had a smooth surface, were glass-clear, contained around 17% by weight of silicon dioxide and had the following particle size distribution:

| | |
|---|---|
| >8 mm | 10 percent by weight |
| 6–8 mm | 45 percent by weight |
| 4–6 mm | 34 percent by weight |
| <4 mm | 11 percent by weight. |

At the end of their flight, the hydrogel spheres were collected in a washing tower which was filled virtually completely with hydrogel spheres and in which the spheres were immediately washed, without ageing, with weakly ammonia-alkaline water at about 50° C. in a continuous countercurrent process until salt-free.

The spheres were then comminuted in a mill to a diameter of less than 2 mm and mixed with water to give a low-viscosity suspension.

The comminuted hydrogel obtained in this way was then introduced into a shaping spray dryer which had a length of 2 meters and a pipe diameter of 0.6 meter. The shaping spray dryer was operated at a gas throughput of 1400 kg/h. The hydrogel was introduced via a rotating nozzle slit at 120° C. The drying time of the hydrogel was about 2 seconds. The resultant support gel was subsequently separated off in a cyclone.

1.2 Preparation of the supported catalyst according to the invention 15 kg of the support gel (1) described above and 40 l of a 4.1% strength by weight solution of chromium (III) nitrate 9-hydrate in ethanol were introduced into a double-cone blender. While the blender, which was heated externally by means of steam to 130° C., was rotated, the ethanol was then distilled off in a water-pump vacuum.

The resultant chromium-containing support gel (2) was heated at 600° C. for 6 hours in a fluidized bed through which air was flowing, and was then cooled again. During the cooling after this activation, the fluidized bed was flushed with nitrogen after a temperature of 140° C. had been reached in order to remove traces of oxygen, which interferes with the polymerization.

The resultant supported catalyst according to the invention had a chromium-content, determined by elemental analysis, of $2 \times 10^{-4}$ mol/g.

1.3 Polymerization of ethylene with the aid of the supported catalyst according to the invention A 1 l autoclave was heated to 95° C., flushed a number of times with ethylene and filled, with stirring, with a total of 500 ml of isobutane. When the desired polymerization temperature of 95° C. had been reached, 67 mg of the supported catalyst according to the invention, obtained from section 1.2, were introduced into the autoclave with ethylene under a pressure of 25 bar. Further ethylene was then introduced until the desired polymerization pressure of from 40 to 42 bar had been reached. During the actual polymerization, the pressure in the autoclave was kept in this pressure range by topping up with ethylene. After a total of 90 minutes, the polymerization was terminated by releasing the pressure.

In this experiment, 285 g of polyethylene were obtained. The productivity of the catalyst used and the bulk density, the Staudinger index and the melt flow index (HLMI) of the resultant polyethylene are shown in the table below.

Example 2

A catalyst according to the invention was prepared by a method similar to that of Example 1, but with 2.5% by weight, based on the support, of ammonium hexafluorosilicate additionally being added in step (1.2) during the supporting by chromium(III) nitrate 9-hydrate and before the activation. The subsequent polymerization was carried out as described in Example 1.

In this experiment, 250 g of polyethylene were obtained. The productivity of the catalyst used and the bulk density, the Staudinger index and the melt flow index (HLMI) of the resultant polyethylene are shown in the table below.

Comparative Experiment A

Preparation of a supported catalyst as described in DE-A 41 32 894, and the use thereof for the polymerization of ethylene:

Example 1 according to the invention was repeated, but the drying in step 1.2 was not carried out in a shaping spray dryer, but instead in a tube dryer having a tube length of 5 meters, a tube diameter of 0.8 meter and an inlet temperature of 400° C.

In this experiment, 230 g of polyethylene were obtained. The productivity of the catalyst used and the bulk density, the Staudinger index and the melt flow index (HLMI) of the resultant polyethylene are shown in the table below.

Comparison Experiment B

A catalyst was prepared by the method of DE-A 41 32 894 as described in Comparative Experiment A and was used to polymerize ethylene. In contrast to Comparative Experiment A, 2.5% by weight, based on the support, of ammonium hexafluorosilicate were additionally added in step (1.2) during the supporting by chromium(III) nitrate 9-hydrate and before the activation. The subsequent polymerization was carried out as described in Example 1.

In this experiment, 250 g of polyethylene were obtained. The productivity of the catalyst used and the bulk density, the Staudinger index and the melt flow index (HLMI) of the resultant polyethylene are shown in the table below.

TABLE

| | Experiment | | Comparative Experiment | |
|---|---|---|---|---|
| | 1 | 2 | A | B |
| Productivity [g of polymer obtained/g of catalyst] | 4,250 | 4,300 | 3,150 | 3,800 |
| Bulk density[a] [g/l] | 330 | 370 | 260 | 280 |
| Staudinger index[b] [cm$^3$/g] | 530 | 580 | 520 | 580 |
| Melt flow index[c] | 1.4 | not determined | 1.6 | not determined |

[a] in accordance with DIN 53 468
[b] in accordance with DIN 53 728
[c] high load melt index [HLMI], in accordance with DIN 53 735, at 190° C. and a weight of 21.6 kg The polyethylenes obtained from Examples 1 and 2 according to the invention have a high bulk density, a high molecular weight and only low proportions of fine particles. The catalyst employed therein, which is likewise novel, is distinguished, inter alia, by high productivity, compared with the catalysts known from the prior art (Comparative Experiments A and B).

We claim:

1. A process for the preparation of polymers of α-olefins by polymerizing the monomers at from 70° to 150° C. and at from 2 to 150 bar by means of a chromium trioxide catalyst, wherein the chromium trioxide catalyst used is the supported catalyst in which
   (1) a silicon dioxide-containing support gel is prepared by
      (1.1) introducing a sodium water glass or potassium water glass solution into a swirling stream of an aqueous mineral acid longitudinally and tangentially to the stream, spraying the resultant silica hydrosol in drop form into a gaseous medium and allowing it to solidify to form a hydrogen, and freeing the resultant hydrogel from salts by washing without prior ageing,
      (1.2) drying the hydrogel resulting from (1.1.) to form the support gel,
   (2) the support gel (1) is charged with chromium trioxide or a chromium compound which can be converted into chromium trioxide under the conditions of process step (3), giving a chromium-containing support gel, and
   (3) the chromium-containing support gel (2) is heated at from 400° to 1100° C. for from 10 to 1000 minutes in an anhydrous gas stream containing oxygen in a concentration of greater than 10% by volume,
which comprises drying the hydrogel resulting from step (1.1) in step (1.2) within a time of not more than 60 seconds in a shaping, high-speed dryer at an inlet temperature of from 80° to 400° C.

2. An α-olefin polymer prepared by a process as claimed in claim 1.

* * * * *

UNITED STATES PATENT AND TRADEMARK OFFICE
CERTIFICATE OF CORRECTION

PATENT NO. : 5,625,013
DATED : April 29, 1997
INVENTOR(S) : MUELLER et al.

It is certified that error appears in the above-indentified patent and that said Letters Patent is hereby corrected as shown below:

Column 8, claim 1, line 44, "hydrogen" should be --hydrogel--

Signed and Sealed this

Eighth Day of July, 1997

Attest:

BRUCE LEHMAN

Attesting Officer

Commissioner of Patents and Trademarks